(12) United States Patent
Zhang et al.

(10) Patent No.: US 12,224,696 B2
(45) Date of Patent: Feb. 11, 2025

(54) HEAD-MOUNTED DISPLAY APPARATUS AND METHOD FOR CONTROLLING THE HEAD-MOUNTED DISPLAY APPARATUS

(71) Applicant: Luxshare Precision Technology (Nanjing) Co., LTD, Nanjing (CN)

(72) Inventors: Qing Zhang, Nanjing (CN); Guojun Xu, Nanjing (CN); Zeyu Liu, Nanjing (CN)

(73) Assignee: LUXSHARE PRECISION TECHNOLOGY (NANJING) CO., LTD, Nanjing (CN)

( * ) Notice: Subject to any disclaimer, the term of this patent is extended or adjusted under 35 U.S.C. 154(b) by 120 days.

(21) Appl. No.: 18/209,163

(22) Filed: Jun. 13, 2023

(65) Prior Publication Data

US 2024/0178770 A1 May 30, 2024

(30) Foreign Application Priority Data

Nov. 28, 2022 (CN) .......................... 202211503931.4

(51) Int. Cl.
*H02P 5/68* (2006.01)
*G06F 1/16* (2006.01)
*H02P 7/025* (2016.01)
*H02P 7/29* (2016.01)

(52) U.S. Cl.
CPC ................ *H02P 5/68* (2013.01); *G06F 1/163* (2013.01); *H02P 7/025* (2016.02); *H02P 7/29* (2013.01)

(58) Field of Classification Search
CPC .......................... G02B 27/0176; G02B 27/08; G02B 27/0172; G06F 3/012; G06F 3/013; H02P 25/034; H02P 25/032; H02P 27/08; H02P 7/00; H02P 7/025; H02P 7/03; H02P 7/06; H02P 7/29; H02P 7/281
See application file for complete search history.

(56) References Cited

U.S. PATENT DOCUMENTS 11,009,713 B1 * 5/2021 Fang ....................... G06F 3/013

FOREIGN PATENT DOCUMENTS

| JP | 2018-44901 A | 3/2018 |
| JP | 2020-69835 A | 5/2020 |
| JP | 2021-48909 A | 4/2021 |

* cited by examiner

*Primary Examiner* — Antony M Paul
(74) *Attorney, Agent, or Firm* — Birch, Stewart, Kolasch & Birch, LLP (57) ABSTRACT

A head-mounted display apparatus includes a display, a strap and a head-turning assisting device; two ends of the strap are fixedly connected to the display; the head-turning assisting device is positioned in the strap; when the head-mounted display apparatus is worn on the head of the human body, the display is positioned in the position of the eyes of the human body, and the strap is wrapped around the head of the human body; the display includes a master controller and a display module, the master controller is electrically connected to both the head-turning assisting device and the display module. The master controller is configured to acquire a display image from the display module, and to control the head-turning assisting device to assist the head of the human body to turn according to the display image.

16 Claims, 4 Drawing Sheets

HEAD-MOUNTED DISPLAY APPARATUS AND METHOD FOR CONTROLLING THE HEAD-MOUNTED DISPLAY APPARATUS

CROSS-REFERENCE TO RELATED APPLICATION(S)

This application claims priority to Chinese Patent Application No. 202211503931.4 filed Nov. 28, 2022, the disclosure of which is incorporated herein by reference in its entirety.

TECHNICAL FIELD

The present invention relates to the field of motion induction technology, and particularly, to a head-mounted display apparatus and a method for controlling the head-mounted display apparatus.

BACKGROUND

Virtual reality (VR) is a technique for providing immersion sensation in a computer-generated, interactive three-dimensional environment using a computer graphics system and various interface devices such as reality and control. The VR glasses use a head-mounted display apparatus to close a person's vision and hearing to the outside and guide the user to generate a feeling of being in a virtual environment. The display principle is that the left and right eye screens display the left and right eye images respectively, and the human eye generates a stereoscopic feeling in the brain after acquiring the information with differences, thereby making a reaction action.

The conventional VR glasses have few functions, and users may have poor experiences in using the VR glasses.

SUMMARY

A head-mounted display apparatus and a method for controlling a head-mounted display apparatus are provided according to the present invention, to improve the experience of a user in using the head-mounted display apparatus.

According to an aspect of the present invention, a head-mounted display apparatus is provided, which includes a display, a strap and a head-turning assisting device.

Two ends of the strap are fixedly connected to the display; and the head-turning assisting device is positioned in the strap.

When the head-mounted display apparatus is worn on the head of a human body, the display is positioned in the position of the eyes of the human body, and the strap surrounds the head of the human body.

The display includes a master controller and a display module, and the master controller is electrically connected to both the head-turning assisting device and the display module.

The master controller is configured to acquire a display image from the display module, and control the head-turning assisting device to assist the head of the human body to turn according to the display image.

Optionally, the head-turning assisting device includes a first flat voice coil motor, a second flat voice coil motor, a third flat voice coil motor and a fourth flat voice coil motor.

A stationary portion of each of the flat voice coil motors is fixed to the strap, and a free portion of each of the flat voice coil motors is positioned at a side, adjacent to the head, of the strap.

When the head-mounted display apparatus is worn on the head of the human body, the first flat voice coil motor is in contact with a left front side of the head, the second flat voice coil motor is in contact with a right rear side of the head, the third flat voice coil motor is in contact with a right front side of the head, and the fourth flat voice coil motor is in contact with a left rear side of the head.

Optionally, the free portion of the first flat voice coil motor and the free portion of the second flat voice coil motor are configured to move simultaneously by a same distance, and a free portion of the third flat voice coil motor and a free portion of the fourth flat voice coil motor are configured to move simultaneously by the same distance.

Optionally, when the free portion of the first flat voice coil motor and the free portion of the second flat voice coil motor move towards the head, the free portion of the third flat voice coil motor and the free portion of the fourth flat voice coil motor do not move or move in a direction away from the head.

Or, when the free portion of the third flat voice coil motor and the free portion of the fourth flat voice coil motor move towards the head, the free portion of the first flat voice coil motor and the free portion of the second flat voice coil motor do not move or move in the direction away from the head.

Optionally, each of the flat voice coil motors further includes a motor controller and a motor driving circuit.

The motor controller is configured to receive a control signal transferred by the master controller and output a drive control signal to the motor driving circuit according to the control signal, and the motor driving circuit is configured to drive the free portion to move according to the drive control signal.

Optionally, the motor controller includes an A/D conversion module, a pulse-width modulation module and a D/A conversion module.

An input terminal of the A/D conversion module is connected to the master controller, an output terminal of the A/D conversion module is electrically connected to an input terminal of the pulse-width modulation module, an output terminal of the pulse-width modulation module is electrically connected to the D/A conversion module, and an output terminal of the D/A conversion module is electrically connected to the motor driving circuit.

Optionally, each of the flat voice coil motors further includes a feedback circuit, and the feedback circuit is electrically connected to each of the motor driving circuit and the motor controller.

According to another aspect of the present invention, a method for controlling a head-mounted display apparatus is provided, which is performed by the head-mounted display apparatus described above, and the method includes as follows.

The master controller acquires a display image from the display module.

A preset turning direction of the head is determined according to the display image.

The head-turning assisting device is controlled to assist the head to turn toward the preset turning direction according to the preset turning direction of the head.

Optionally, the head-turning assisting device includes a first flat voice coil motor, a second flat voice coil motor, a third flat voice coil motor, and a fourth flat voice coil motor. A stationary portion of each of the flat voice coil motors is fixed to the strap, and a free portion of each of the flat voice coil motors is positioned at a side, adjacent to the head, of the strap. When the head-mounted display apparatus is worn on the head of the human body, the first flat voice coil motor is in contact with a left front side of the head, the second flat voice coil motor is in contact with a right rear side of the head, the third flat voice coil motor is in contact with a right front side of the head, and the fourth flat voice coil motor is in contact with a left rear side of the head.

The step that the head-turning assisting device is controlled to assist the head to turn toward the preset turning direction according to the preset turning direction of the head includes as follows.

When the master controller determines that the preset turning direction of the head is a direction of turning right, the free portion of the first flat voice coil motor and the free portion of the second flat voice coil motor are controlled to move a first distance toward the head at the same time.

When the master controller determines that the preset turning direction of the head is a direction of turning left, the free portion of the third flat voice coil motor and the free portion of the fourth flat voice coil motor are controlled to move a second distance toward the head at the same time.

Optionally, the method for controlling the head-mounted display apparatus further includes as follows.

When the free portion of the first flat voice coil motor and the free portion of the second flat voice coil motor are controlled to move a first distance towards the head at the same time, the free portion of the third flat voice coil motor and the free portion of the fourth flat voice coil motor are controlled not to move, or the free portion of the third flat voice coil motor and the free portion of the fourth flat voice coil motor are controlled to move in the direction away from the head to be at an initial distance from the head.

When the free portion of the third flat voice coil motor and the free portion of the fourth flat voice coil motor are controlled to move a second distance towards the head at the same time, the free portion of the first flat voice coil motor and the free portion of the second flat voice coil motor are controlled not to move, or the free portion of the first flat voice coil motor and the free portion of the second flat voice coil motor are controlled to move in the direction away from the head to be at the initial distance from the head.

In the head-mounted display apparatus according to the embodiments of the present invention, the head-turning assisting device is arranged in the strap, and the head-turning assisting device is controlled by the master controller in the display to apply a pressure or a stimulation to the head of the user so as to assist the user in making a head turning action corresponding to the current display image, that is, the head of the user can be assisted to turn toward the preset turning direction, thereby effectively improving the experience of the user in using the head-mounted display apparatus.

BRIEF DESCRIPTION OF DRAWINGS

To illustrate the solution in embodiments of the present invention more clearly, the drawings used in description of the embodiments are briefly described hereinafter. Apparently, the drawings described hereinafter merely illustrate part of the embodiments of the present invention, and for the person of ordinary skill in the art, other drawings can further be obtained according to theses drawings on the premise that no creative efforts are made.

DETAILED DESCRIPTION

For a better understanding of the technical solutions of the present invention by the person skilled in the art, the solutions in embodiments of the present invention are described clearly and completely in conjunction with the drawings in embodiments of the present invention. Apparently, the embodiments described hereinafter are part, rather than all, of the embodiments of the present disclosure. Based on the embodiments described herein, all other embodiments obtained by the person skilled in the art on the premise that no creative work is done are within the scope of the present invention.

It is to be noted that the terms "first", "second" and the like in the description, claims and drawings of the present invention are intended to distinguish between similar objects and are not necessarily used to describe a particular order or sequence. It should be understood that the data used in this way is interchangeable where appropriate so that the embodiments of the present disclosure described herein may also be implemented in a sequence not illustrated or described herein. In addition, the terms "include", "have" or any other variations thereof are intended to encompass a non-exclusive inclusion. For example, a process, method, system, product or equipment that includes a series of steps or units not only includes the expressly listed steps or units but may also include other steps or units that are not expressly listed or are inherent to such process, method, product or equipment.

Figure 1:
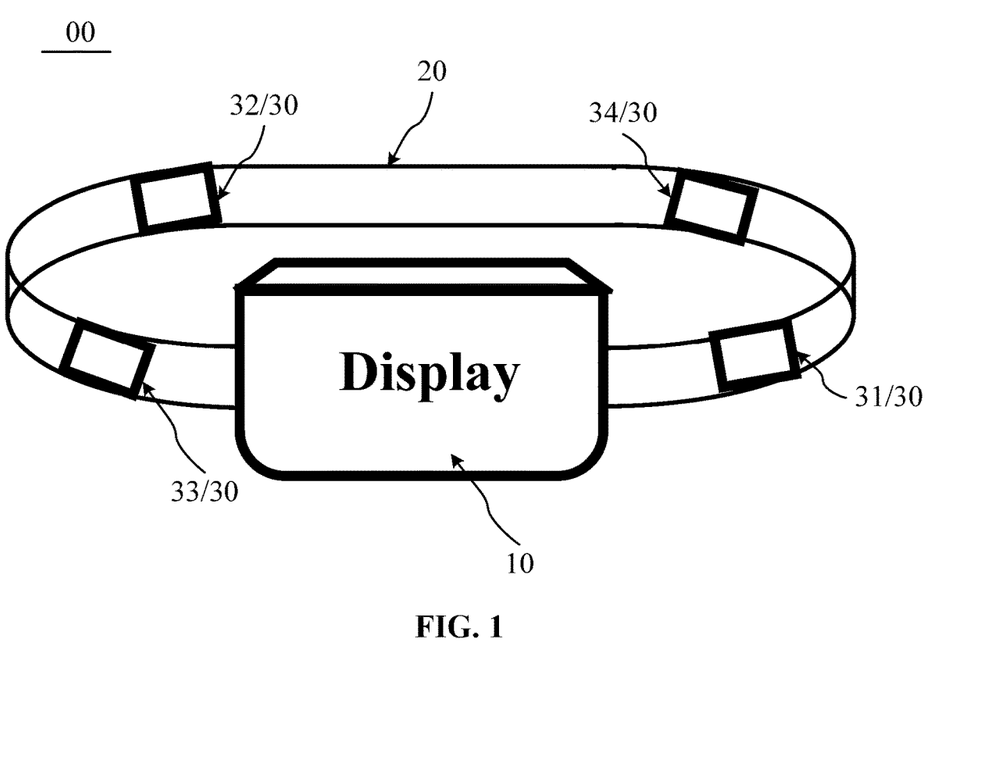
FIG. 1 is a schematic structural diagram of a head-mounted display apparatus according to an embodiment of the present invention.
Figure 2:
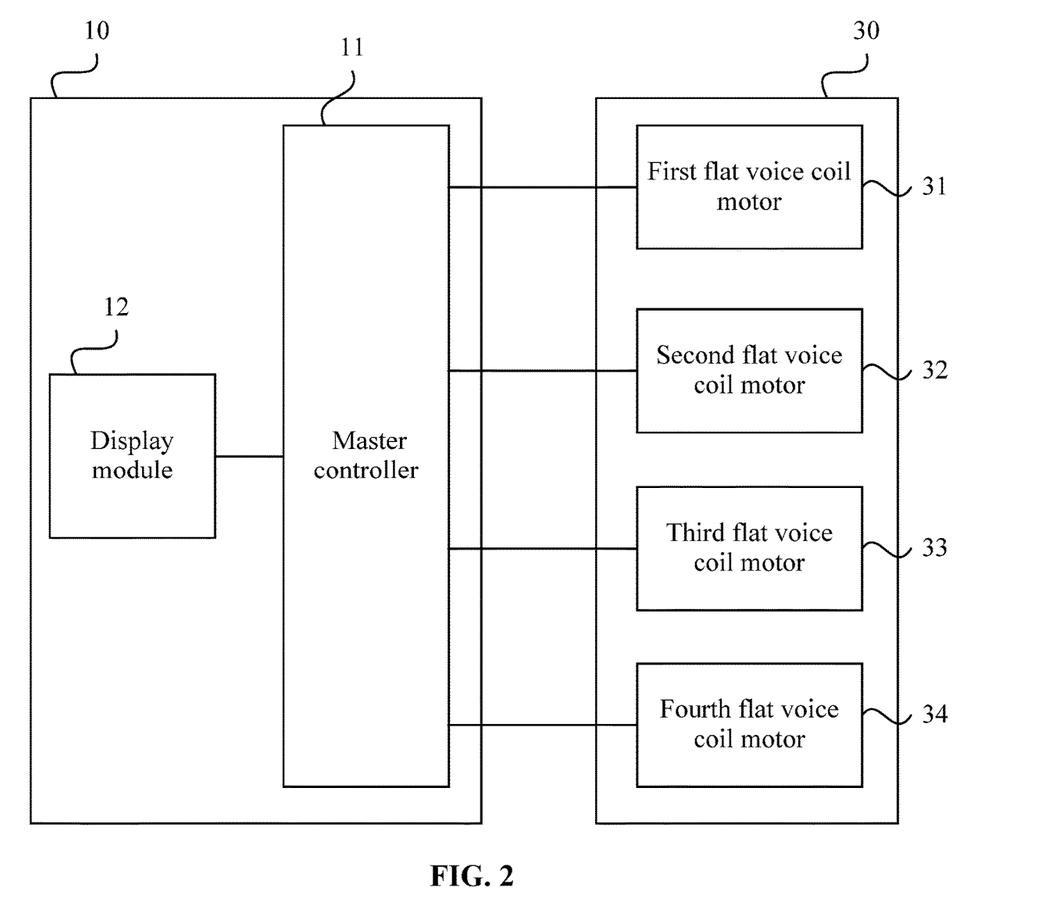
FIG. 2 is a circuit diagram of a head-mounted display apparatus according to an embodiment of the present invention.

FIG. 1 is a schematic structural diagram of a head-mounted display apparatus according to an embodiment of the present invention. As shown in FIG. 1, the head-mounted display apparatus 00 includes a display 10, a strap 20, and a head-turning assisting device 30. Two ends of the strap 20 are fixedly connected to the display 10; the head-turning assisting device 30 is positioned in the strap 20; when the head-mounted display apparatus 00 is worn on the head of the human body, the display 10 is positioned in the position of the eyes of the human body, and the strap 20 surrounds the head of the human body. FIG. 2 is a circuit diagram of a head-mounted display apparatus according to an embodiment of the present invention. As shown in FIG. 2, the display 10 includes a master controller 11 and a display module 12, and the master controller 11 is electrically connected to both the head-turning assisting device 30 and the display module 12. The master controller 11 is configured to acquire a display image from the display module 12, and to control the head-turning assisting device 30 to assist the head-turning of the human body according to the display image.

Specifically, the head-mounted display apparatus 00 may be a VR display, also commonly referred to as VR glasses. The head-mounted display apparatus 00 mainly includes a display 10 and a strap 20. Two ends of the strap 20 are fixed to opposite ends of the display 10 to form a closed-loop structure so as to fit over the head of a human body. When the user wears the head-mounted display 00 on the head, the display 10 for displaying the image in the head-mounted display apparatus 00 is positioned in the position of the eyes of the head so that the user can see the image, and the strap 20 is wrapped around the head so that the display 10 is fixed in the position of the eyes. The head-turning assisting device 30 may be arranged in the strap 20. The display 10 generally includes a master controller 11 and a display module 12. The master controller 11 may control the display module 12 to display an image, and may acquire an image displayed by the display module 12. After the image displayed by the display module 12 is acquired, the image data may be analyzed to determine a direction of turning to be made by the user for the current display image, that is, to determine a preset turning direction of the user's head. After the preset turning direction of the user's head is determined, a control signal is sent to the head-turning assisting device 30 to control the head-turning assisting device 30 to apply a stimulation or pressure to the user's head so that the user's head can turn in the preset turning direction under the assistance of the head-turning assisting device 30, thereby improving the experience of the user in using the head-mounted display apparatus 00.

In the head-mounted display apparatus according to an embodiment of the present invention, the head-turning assisting device is provided in the strap, and the head-turning assisting device is controlled by the master controller in the display to apply a pressure or a stimulation to the head of the user so as to assist the user in making a head turning action corresponding to the current display image, that is, the head of the user can be assisted to turn in the preset turning direction, thereby effectively improving the experience of the user in using the head-mounted display apparatus.

Optionally, referring to FIG. 1, the head-turning assisting device 30 includes a first flat voice coil motor 31, a second flat voice coil motor 32, a third flat voice coil motor 33 and a fourth flat voice coil motor 34. A stationary portion of each of the flat voice coil motors is fixed to the strap 20, and a free portion of each of the flat voice coil motors is positioned at a side, close to the head, of the strap 20. When the head-mounted display apparatus 00 is worn on the head of the human body, the first flat voice coil motor 31 is in contact with a left front side of the head, the second flat voice coil motor 32 is in contact with a right rear side of the head, the third flat voice coil motor 33 is in contact with a right front side of the head, and the fourth flat voice coil motor 34 is in contact with a left rear side of the head.

Specifically, the head-turning assisting device 30 may include four flat voice coil motors, namely, the first flat voice coil motor 31, the second flat voice coil motor 32, the third flat voice coil motor 33, and the fourth flat voice coil motor 34, and the flat voice coil motors may have the same size and specification parameters, so as to facilitate control of the master controller 11 to each of the flat voice coil motors. Each of the flat voice coil motor includes the stationary portion whose position remains fixed and the free portion movable according to the magnitude of the current. When a certain flat voice coil motor is required to apply pressure to the head of the human body, the coil in the flat voice coil motor can be supplied with a current signal to allow the free portion of the flat voice coil motor to move toward the head of the user, whereby the pressure can be applied to the head of the user, thereby enabling the head of the user to turn under the pressure. Specifically, the four flat voice coil motors are arranged on the left front side, the right rear side, the right front side and the left rear side of the head, respectively, it is possible to simultaneously control the first flat voice coil motor 31 on the left front side and the second flat voice coil motor 32 on the right rear side to simultaneously apply pressures to the head according to the hanger reflex principle, so that the head can be turned to the right, or it is possible to simultaneously control the third flat voice coil motor 33 on the right front side and the fourth flat voice coil motor 34 on the left rear side to simultaneously apply pressures to the head so that the head can be turned to the left.

For example, the free portion of the first flat voice coil motor 31 and the free portion of the second flat voice coil motor 32 are configured to move simultaneously by the same distance, and the free portion of the third flat voice coil motor 33 and the free portion of the fourth flat voice coil motor 34 are configured to move simultaneously by the same distance.

Specifically, the master controller 11, when controlling the free portions of the flat voice coil motors to move, may output the same control signal to the first flat voice coil motor 31 and the second flat voice coil motor 32, and output the same control signal to the third flat voice coil motor 33 and the fourth flat voice coil motor 34, and the control signal output to the first flat voice coil motor 31 is different from the control signal output to the third flat voice coil motor 33. In this way, it can ensure that the free portion of the first flat voice coil motor 31 and the free portion of the second flat voice coil motor 32 move the same distance toward the head of the human body at the same time, so that action forces of the same magnitude in opposite directions can be generated to the left front side and the right rear side of the head of the user to allow the head of the user to turn to the right, or it can ensure that the free portion of the third flat voice coil motor 33 and the free portion of the fourth flat voice coil motor 34 move the same distance toward the head of the human body at the same time, so that action forces of the same magnitude in opposite directions can be generated to the right front side and the left rear side of the head of the user to allow the head of the user to turn to the left.

Optionally, with continued reference to FIG. 1, when the free portion of the first flat voice coil motor 31 and the free portion of the second flat voice coil motor 32 move towards the head, the free portion of the third flat voice coil motor 33 and the free portion of the fourth flat voice coil motor 34 do not move or move in a direction away from the head. Or, when a free portion of the third flat voice coil motor 33 and a free portion of the fourth flat voice coil motor 34 move towards the head, the free portion of the first flat voice coil motor 31 and the free portion of the second flat voice coil motor 32 are do not move or move in the direction away from the head.

Specifically, when the free portion of the first flat voice coil motor 31 and the free portion of the second flat voice coil motor 32 move towards the head, the free portion of the third flat voice coil motor 33 and the free portion of the fourth flat voice coil motor 34 may be controlled not to move to ensure that only the first flat voice coil motor 31 and the second flat voice coil motor 32 apply pressures to the head to allow the head to turn to the right. Or, if the free portion of the third flat voice coil motor 33 and the free portion of the fourth flat voice coil motor 34 have moved towards the head by a distance before this, the free portion of the third flat voice coil motor 33 and the free portion of the fourth flat voice coil motor 34 can be controlled to move in the direction away from the head while the free portion of the first flat voice coil motor 31 and the free portion of the second flat voice coil motor 32 move towards the head, to allow the free portion of the third flat voice coil motor 33 and the free portion of the fourth flat voice coil motor 34 to return to the initial position. In this way, the turning of the head to the right can be further ensured, and it is possible to avoid excessive pressures applied to the head of the user when the free portion of the third flat voice coil motor 33 and the free portion of the fourth flat voice coil motor 34 move towards the head of the user again, and discomfort caused to the user accordingly. Similarly, when the free portion of the third flat voice coil motor 33 and the free portion of the fourth flat voice coil motor 34 move towards the head, the free portion of the first flat voice coil motor 31 and the free portion of the second flat voice coil motor 32 may be controlled not to move to ensure that only the third flat voice coil motor 33 and the fourth flat voice coil motor 34 apply pressures to the head to allow the head to turn to the left. Or, if the free portion of the first flat voice coil motor 31 and the free portion of the second flat voice coil motor 32 have moved towards the head by a distance before this, the free portion of the first flat voice coil motor 31 and the free portion of the second flat voice coil motor 32 can be controlled to move in the direction away from the head while the free portion of the third flat voice coil motor 33 and the free portion of the fourth flat voice coil motor 34 move towards the head, to allow the free portion of the first flat voice coil motor 31 and the free portion of the second flat voice coil motor 32 to return to the initial position. In this way, the turning of the head to the left can be further ensured, and it is possible to avoid excessive pressures applied to the head of the user when the free portion of the first flat voice coil motor 31 and the free portion of the second flat voice coil motor 32 move towards the head of the user again, and discomfort caused to the user accordingly.

Figure 3:
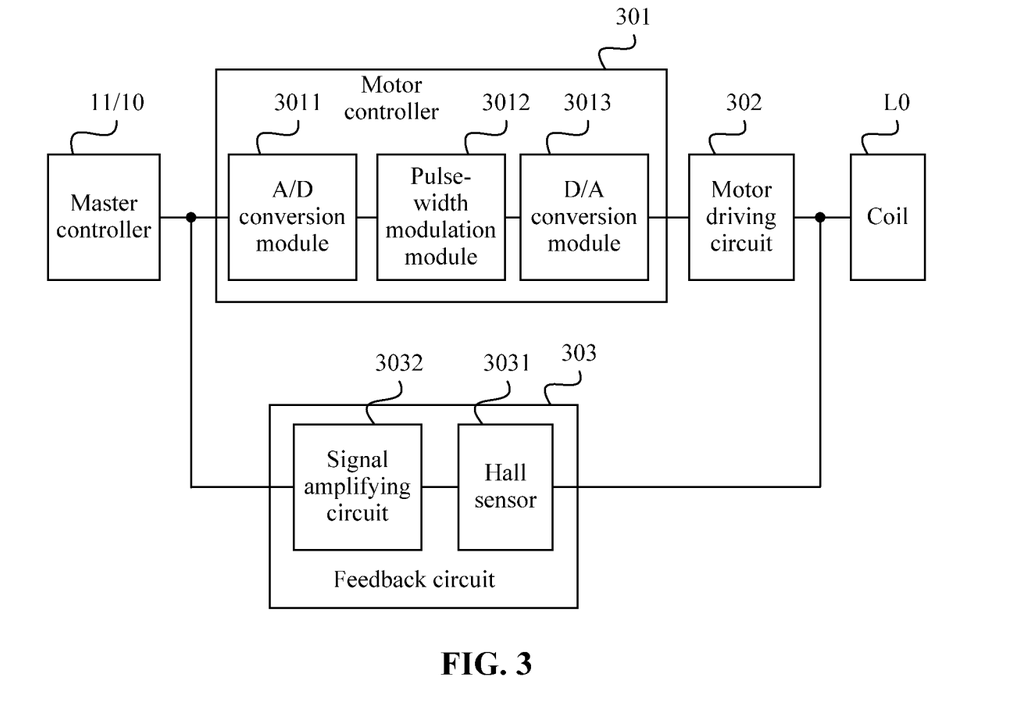
FIG. 3 is a schematic structural diagram of a flat voice coil motor according to an embodiment of the present invention.

Optionally, FIG. 3 is a schematic structural diagram of a flat voice coil motor according to an embodiment of the present invention. As shown in FIG. 3, each of the flat voice coil motors further includes a motor controller 301 and a motor driving circuit 302. The motor controller 301 is configured to receive a control signal transferred by the master controller 11 and output a drive control signal to the motor driving circuit 302 according to the control signal, and the motor driving circuit 302 is configured to drive the free portion to move according to the drive control signal.

Specifically, the motor controller 301 of each of the flat voice coil motors may be communicatively or electrically connected to the master controller 11 of the display 10, so that the master controller 11 can transfer control signals to the motor controllers 301 of the flat voice coil motors according to the current display image. In each of the flat voice coil motors, the motor controller 301 is electrically connected to the motor driving circuit 302, and the motor controller 301, after analyzing the received control signal, outputs a drive control signal to the motor driving circuit 302 accordingly, so that, the motor driving circuit 302 can output a driving current to a coil LO in the motor according to the drive control signal, and the driving current flows through the coil to generate a magnetic field, so that the free portion moves under the action of the magnetic field. In addition, the moving distance of the free portion may be controlled by controlling the magnitude of the driving current, and the moving direction of the free portion may be controlled by controlling the direction of the driving current.

Optionally, with continued reference to FIG. 3, the motor controller 301 includes an A/D conversion module 3011, a pulse-width modulation module 3012 and a D/A conversion module 3013. An input terminal of the A/D conversion module 3011 is connected to the master controller 11, an output terminal of the A/D conversion module 3011 is electrically connected to an input terminal of the pulse-width modulation module 3012, an output terminal of the pulse-width modulation module 3012 is electrically connected to the D/A conversion module 3013, and an output terminal of the D/A conversion module 3013 is electrically connected to the motor driving circuit 302.

Specifically, the control signal transferred by the master controller 11 is generally a voltage signal of analog quantity. After receiving the control signal, the motor controller 301 first converts the control signal of analog quantity into a signal of digital quantity through the A/D conversion module 3011, adjusts the pulse width of the PWM signal according to the signal of digital quantity through the pulse-width modulation module 3012, and then converts the PWM signal of digital quantity with an adjusted pulse width into a square wave of the analog quantity through the D/A conversion module 3013 to output, that is, to provide the drive control signal of analog quantity to the motor driving circuit 302.

Optionally, with continued reference to FIG. 3, each of the flat voice coil motors further includes a feedback circuit 303, and the feedback circuit 303 is electrically connected to each of the motor driving circuit 302 and the motor controller 301.

Specifically, the feedback circuit 303 is configured to acquire a driving current output by the motor driving circuit 302, and provide a feedback signal to the motor controller 301 according to the driving current, to enable the motor controller 301 to adjust, in conjunction with the control signal sent by the master controller 11 and the feedback signal provided by the feedback circuit 303, the drive control signal provided to the motor driving circuit 302, so as to improve the accuracy of the drive control signal, thereby improving the accuracy of the moving distance of the free portion of the flat voice coil motor.

For example, the feedback circuit 303 may include a Hall sensor 3031 and a signal amplifying circuit 3032, the Hall sensor 3031 is electrically connected to each of an output terminal of the motor driving circuit 302 and an input terminal of the signal amplifying circuit 3032, and an output terminal of the signal amplifying circuit 3032 is electrically connected to an input terminal of the motor controller 301. The Hall sensor 3031 can acquire a driving current output by the motor driving circuit 302 and send the driving current to the signal amplifying circuit 3032. The signal amplifying circuit 3032 can be a differential amplification circuit, which can convert the received current signal into a voltage signal and amplify the signal, to allow the amplified voltage signal to be fed back to the motor controller 301, so that the motor controller 301 can adjust, in conjunction with the control signal sent by the master controller 11 and the fed back voltage signal, the drive control signal provided to the motor drive circuit 302.

Based on the above-described head-mounted display apparatus, a control method for controlling a head-mounted display apparatus is further provided according to an embodiment of the present invention, the method for controlling the head-mounted display apparatus is performed by the head-mounted display apparatus according to any embodiment of the present invention.

Figure 4:
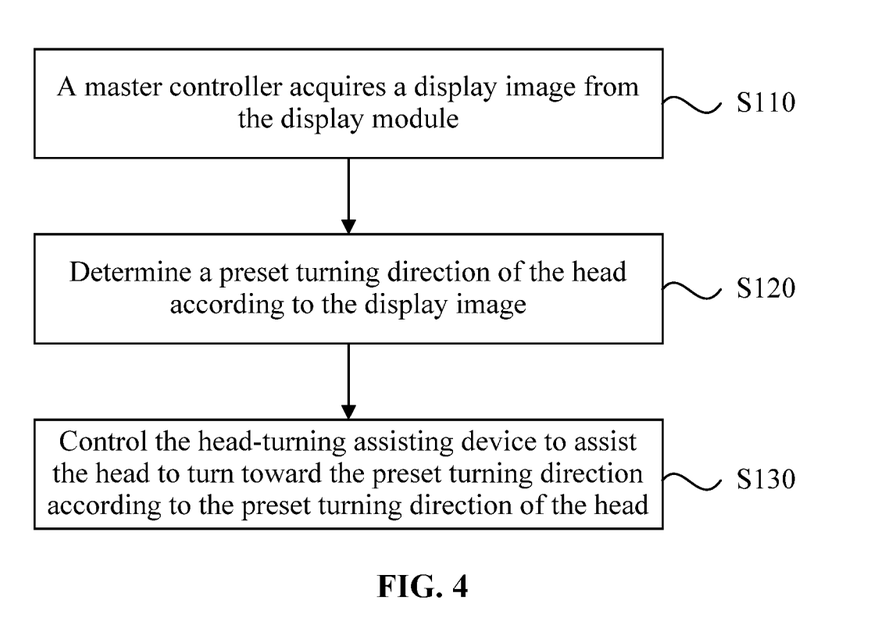
FIG. 4 is a flowchart of a method for controlling a head-mounted display apparatus according to an embodiment of the present invention.

FIG. 4 is a flowchart of a method for controlling a head-mounted display apparatus according to an embodiment of the present invention. As shown in FIG. 4, the method for controlling the head-mounted display apparatus includes: S110, S120 and S130.

In the S110, the master controller acquires a display image from the display module.

In the S120, a preset turning direction of the head is determined according to the display image.

In the S130, the head-turning assisting device is controlled to assist the head to turn toward the preset turning direction according to the preset turning direction of the head.

Specifically, with reference to FIG. 1 and FIG. 2, the master controller 11 in the display 10 can acquire a display image from the display module 12, and after acquiring the image, the current image data can be analyzed and processed to determine the direction of turning head that the user should make for the image, that is, a preset turning direction of the head of the user when the user sees the image. In this way, the control signal can be transferred to the head-turning assisting device 30 according to the determined preset turning direction, to allow the head-turning assisting device 30 to apply a pressure or stimulation to the head of the user according to the control signal, so that the head of the user rotates according to the preset turning direction, thereby improving the experience of the user in using the head-mounted display apparatus.

The control method for controlling the head-mounted display apparatus according to the embodiment of the present invention can assist a user's head to turn toward a preset turning direction, thereby effectively improving the experience of the user in using the head-mounted display apparatus.

Figure 5:
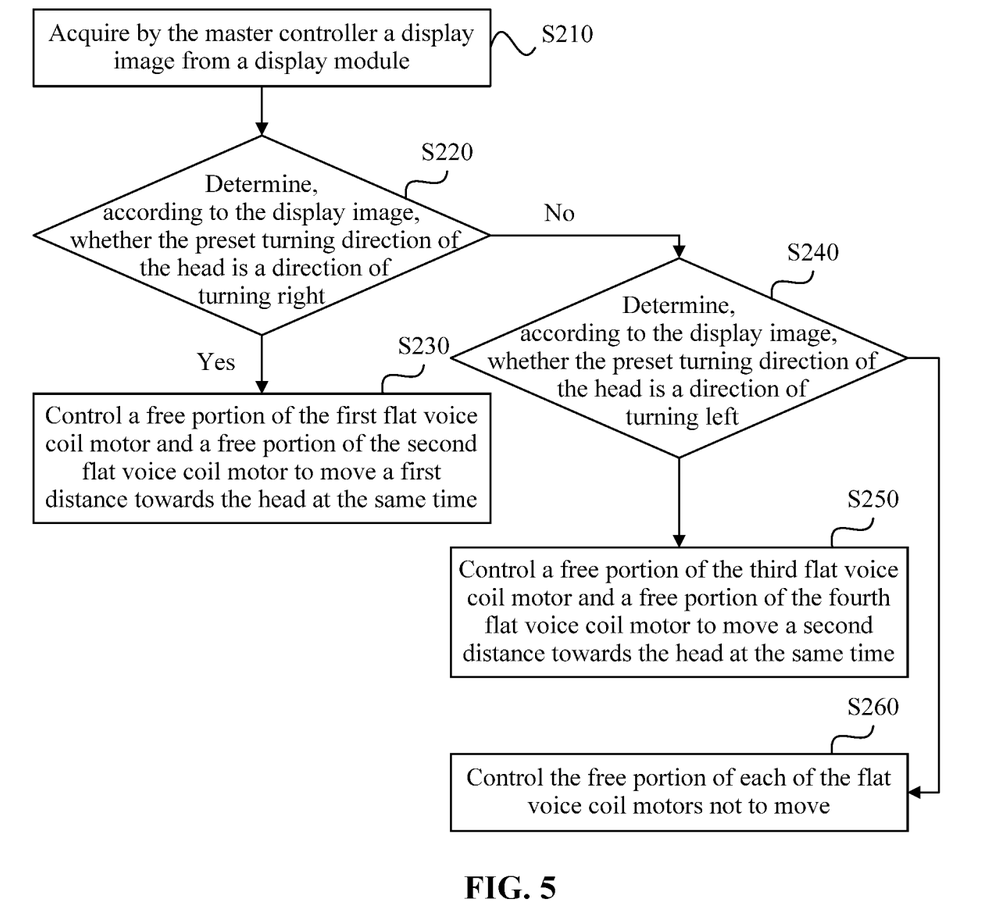
FIG. 5 is a flowchart of another method for controlling a head-mounted display apparatus according to an embodiment of the present invention.

Optionally, referring to FIG. 1 and FIG. 2, the head-turning assisting device 30 includes a first flat voice coil motor 31, a second flat voice coil motor 32, a third flat voice coil motor 33 and a fourth flat voice coil motor 34. A stationary portion of each of the flat voice coil motors is fixed to the strap 20, and a free portion of each of the flat voice coil motors is positioned at a side, close to the head, of the strap 20. When the head-mounted display apparatus 00 is worn on the head of the human body, the first flat voice coil motor 31 is in contact with a left front side of the head, the second flat voice coil motor 32 is in contact with a right rear side of the head, the third flat voice coil motor 33 is in contact with a right front side of the head, and the fourth flat voice coil motor 34 is in contact with a left rear side of the head. FIG. 5 is a flowchart of another method for controlling head-mounted display apparatus according to an embodiment of the present invention. As shown in FIG. 5, the method for controlling the head-mounted display apparatus includes: S210, S220, S230, S240, S250 and S260 as follows.

In the S210, the master controller acquires a display image from the display module.

In the S220, it is determined, according to the display image, whether the preset turning direction of the head is a direction of turning right; if it is yes, go to S230, and if it is no, go to S240.

In the S230, the free portion of the first flat voice coil motor and the free portion of the second flat voice coil motor are controlled to move a first distance towards the head at the same time.

Referring to FIG. 1, when determining that the preset turning direction of the head is a direction of turning right, the master controller 11 controls the free portion of the first flat voice coil motor 31 and the free portion of the second flat voice coil motor 32 to move the same distance, that is, a first distance, toward the head of the human body at the same time. In this way, action forces of the same magnitude in opposite directions can be generated to the left front side and the right rear side of the head of the user to allow the head of the user to turn to the right.

For example, when the free portion of the first flat voice coil motor 31 and the free portion of the second flat voice coil motor 32 are controlled to move the first distance towards the head at the same time, the free portion of the third flat voice coil motor 33 and the free portion of the fourth flat voice coil motor 34 can be controlled not to move, or the free portion of the third flat voice coil motor 33 and the free portion of the fourth flat voice coil motor 34 can be controlled to move in the direction away from the head to be at an initial distance from the head.

Specifically, the initial distance may be a position in which the free portion is positioned when no action force is applied to the user's head by the third flat voice coil motor 33 and the fourth flat voice coil motor 34. When the free portion of the first flat voice coil motor 31 and the free portion of the second flat voice coil motor 32 move towards the head, the free portion of the third flat voice coil motor 33 and the free portion of the fourth flat voice coil motor 34 may be controlled not to move to ensure that only the first flat voice coil motor 31 and the second flat voice coil motor 32 apply pressures to the head to allow the head to turn to the right. Or, if the free portion of the third flat voice coil motor 33 and the free portion of the fourth flat voice coil motor 34 have moved towards the head by a distance before this, the free portion of the third flat voice coil motor 33 and the free portion of the fourth flat voice coil motor 34 can be controlled to move in the direction away from the head while the free portion of the first flat voice coil motor 31 and the free portion of the second flat voice coil motor 32 move towards the head, to allow the free portion of the third flat voice coil motor 33 and the free portion of the fourth flat voice coil motor 34 to return to the initial position. In this way, the turning of the head to the right can be further ensured, and it is possible to avoid excessive pressures applied to the head of the user when the free portion of the third flat voice coil motor 33 and the free portion of the fourth flat voice coil motor 34 move towards the head of the user again, and discomfort caused to the user accordingly.

In the S240, it is determined, according to the display image, whether the preset turning direction of the head is a direction of turning left; if it is yes, go to the S250; and if it is not, go to the S260.

In the S250, the free portion of the third flat voice coil motor and the free portion of the fourth flat voice coil motor are controlled to move a second distance towards the head at the same time.

Specifically, when it is determined that the preset turning direction of the head is a direction of turning left, the master controller 11 controls the free portion of the third flat voice coil motor 33 and the free portion of the fourth flat voice coil motor 34 to move the same distance toward the head of the human body at the same time, that is, a second distance, and in this way, action forces of the same magnitude in opposite directions are generated for the right front side and the left rear side of the head of the user, so that the head of the user is turned to the left.

For example, when the free portion of the third flat voice coil motor 33 and the free portion of the fourth flat voice coil motor 34 are controlled to move a second distance towards the head at the same time, the free portion of the first flat voice coil motor 31 and the free portion of the second flat voice coil motor 32 are controlled not to move, or the free portion of the first flat voice coil motor 31 and the free portion of the second flat voice coil motor 32 are controlled to move in the direction away from the head to be at the initial distance.

Specifically, when the free portion of the third flat voice coil motor 33 and the free portion of the fourth flat voice coil motor 34 move towards the head, the free portion of the first flat voice coil motor 31 and the free portion of the second flat voice coil motor 32 may be controlled not to move to ensure that only the third flat voice coil motor 33 and the fourth flat voice coil motor 34 apply pressures to the head to allow the head to turn to the left. Or, if the free portion of the first flat voice coil motor 31 and the free portion of the second flat voice coil motor 32 have moved towards the head by a distance before this, the free portion of the first flat voice coil motor 31 and the free portion of the second flat voice coil motor 32 can be controlled to move in the direction away from the head while the free portion of the third flat voice coil motor 33 and the free portion of the fourth flat voice coil motor 34 move towards the head, to allow the free portion of the first flat voice coil motor 31 and the free portion of the second flat voice coil motor 32 to return to the initial position. In this way, the turning of the head to the left can be further ensured, and it is possible to avoid excessive pressure applied to the head of the user when the free portion of the first flat voice coil motor 31 and the free portion of the second flat voice coil motor 32 move towards the head of the user again, and discomfort caused to the user accordingly.

In the S260, the free portion of each of the flat voice coil motors is controlled not to move.

Specifically, if it is determined according to the display image that the preset turning direction of the head is neither turned to the left nor to the right, the free portion of each of the flat voice coil motors is controlled not to move, that is, no pressure is applied to each position of the head of the user, and the control to the turning of the head of the user is not performed.

In other possible embodiment of the present invention, the user may select the operating mode of the head-mounted display apparatus as desired, e.g., a game mode, a relaxation mode and a help mode, etc. can be selected. When the user selects the game mode, the display module displays an image, and the master controller controls the head-turning assisting device to apply a pressure to the head by using the method described above. The user may select the relaxation mode by himself or automatically enter the relaxation mode when the head-mounted display apparatus has been in the game mode for a long duration (the duration may be set by the user himself). The first flat voice coil motor and the second flat voice coil motor may be a first motor group, and the third flat voice coil motor and the fourth flat voice coil motor may be a second motor group. In the relaxation mode, the first motor group and the second motor group may alternately apply a pressure to the head, and the durations for which the first motor group and the second motor group apply pressures to the head may be set by the user himself according to design requirements. The user may exit the relaxation mode by himself or exit by himself after setting the preset duration for the relaxation mode. In the help mode, the master controller can control the display module to display text information related to the display image, which can help the hearing-impaired person to comprehensively sense the interaction experience brought by the VR under the visual effect of the display image and the display text in combination with the function of the head-turning assisting device, and can improve the experience of the hearing-impaired person in using the head-mounted display apparatus.

It is to be understood that various forms of the preceding flows may be used with steps reordered, added, or removed. For example, the steps described in the present invention may be performed in parallel or sequentially or in a different order, and this is not limited herein as long as the desired result of the technical solution of the present invention can be realized.

What is claimed is:

1. A head-mounted display apparatus, comprising a display, a strap and a head-turning assisting device; wherein
    two ends of the strap are fixedly connected to the display; and the head-turning assisting device is positioned in the strap;
    when the head-mounted display apparatus is worn on a head of a human body, the display is configured to be positioned in a position of eyes of the human body, and the strap is configured to surround the head of the human body;
    the display comprises a master controller and a display module, and the master controller is electrically connected to both the head-turning assisting device and the display module; and
    the master controller is configured to acquire a display image from the display module, and control the head-turning assisting device to assist the head of the human body to turn according to the display image.

2. The head-mounted display apparatus according to claim 1, wherein the head-turning assisting device comprises a first flat voice coil motor, a second flat voice coil motor, a third flat voice coil motor and a fourth flat voice coil motor;
    a stationary portion of each of the first flat voice coil motor, the second flat voice coil motor, the third flat voice coil motor and the fourth flat voice coil motor is fixed to the strap, and a free portion of each of the first flat voice coil motor, the second flat voice coil motor, the third flat voice coil motor and the fourth flat voice coil motor is positioned at a side, adjacent to the head, of the strap; and
    when the head-mounted display apparatus is worn on the head of the human body, the first flat voice coil motor is in contact with a left front side of the head, the second flat voice coil motor is in contact with a right rear side of the head, the third flat voice coil motor is in contact with a right front side of the head, and the fourth flat voice coil motor is in contact with a left rear side of the head.

3. The head-mounted display apparatus according to claim 2, wherein the free portion of the first flat voice coil motor and the free portion of the second flat voice coil motor are configured to move simultaneously by a same distance, and a free portion of the third flat voice coil motor and a free portion of the fourth flat voice coil motor are configured to move simultaneously by a same distance.

4. The head-mounted display apparatus according to claim 3, wherein when the free portion of the first flat voice coil motor and the free portion of the second flat voice coil motor move towards the head, the free portion of the third flat voice coil motor and the free portion of the fourth flat voice coil motor do not move or move in a direction away from the head;
    or, when the free portion of the third flat voice coil motor and the free portion of the fourth flat voice coil motor move towards the head, the free portion of the first flat voice coil motor and the free portion of the second flat voice coil motor do not move or move in a direction away from the head.

5. The head-mounted display apparatus according to claim 2, wherein each of the first flat voice coil motor, the second flat voice coil motor, the third flat voice coil motor and the fourth flat voice coil motor further comprises a motor controller and a motor driving circuit; and the motor controller is configured to receive a control signal transferred by the master controller and output a drive control signal to the motor driving circuit according to the control signal, and the motor driving circuit is configured to drive the free portion to move according to the drive control signal.

6. The head-mounted display apparatus according to claim 5, wherein the motor controller comprises an A/D conversion module, a pulse-width modulation module and a D/A conversion module; and an input terminal of the A/D conversion module is connected to the master controller, an output terminal of the A/D conversion module is electrically connected to an input terminal of the pulse-width modulation module, an output terminal of the pulse-width modulation module is electrically connected to the D/A conversion module, and an output terminal of the D/A conversion module is electrically connected to the motor driving circuit.

7. The head-mounted display apparatus according to claim 5, wherein each of the first flat voice coil motor, the second flat voice coil motor, the third flat voice coil motor and the fourth flat voice coil motor further comprises a feedback circuit, and the feedback circuit is electrically connected to each of the motor driving circuit and the motor controller.

8. A method for controlling a head-mounted display apparatus, the head-mounted display apparatus comprising a display, a strap and a head-turning assisting device; wherein two ends of the strap are fixedly connected to the display; the head-turning assisting device is positioned in the strap; the display comprises a master controller and a display module, and the master controller is electrically connected to both the head-turning assisting device and the display module;

the method comprising:

wearing the head-mounted display apparatus on a head of a human body, such that the display is positioned in a position of eyes of the human body, and the strap surrounds the head of the human body;

acquiring, by the master controller, the display image from the display module;

determining, by the master controller, a preset turning direction of the head according to the display image; and controlling, by the master controller, the head-turning assisting device to assist the head to turn toward the preset turning direction according to the preset turning direction of the head.

9. The method for controlling the head-mounted display apparatus according to claim 8, wherein the head-turning assisting device comprises a first flat voice coil motor, a second flat voice coil motor, a third flat voice coil motor, and a fourth flat voice coil motor; a stationary portion of each of the first flat voice coil motor, the second flat voice coil motor, the third flat voice coil motor and the fourth flat voice coil motor is fixed to the strap, and a free portion of each of the first flat voice coil motor, the second flat voice coil motor, the third flat voice coil motor and the fourth flat voice coil motor is positioned at a side, adjacent to the head, of the strap; when the head-mounted display apparatus is worn on the head of the human body, the first flat voice coil motor is in contact with a left front side of the head, the second flat voice coil motor is in contact with a right rear side of the head, the third flat voice coil motor is in contact with a right front side of the head, and the fourth flat voice coil motor is in contact with a left rear side of the head;

wherein controlling the head-turning assisting device to assist the head to turn toward the preset turning direction according to the preset turning direction of the head comprises:

when the master controller determines that the preset turning direction of the head is a direction of turning to right, controlling the free portion of the first flat voice coil motor and the free portion of the second flat voice coil motor to move a first distance toward the head at a same time; and when the master controller determines that the preset turning direction of the head is a direction of turning left, controlling the free portion of the third flat voice coil motor and the free portion of the fourth flat voice coil motor to move a second distance toward the head at a same time.

10. The method for controlling the head-mounted display apparatus according to claim 9, further comprising:

when controlling the free portion of the first flat voice coil motor and the free portion of the second flat voice coil motor to move a first distance towards the head at a same time, controlling the free portion of the third flat voice coil motor and the free portion of the fourth flat voice coil motor not to move, or controlling the free portion of the third flat voice coil motor and the free portion of the fourth flat voice coil motor to move in a direction away from the head to be at an initial distance from the head; and when controlling the free portion of the third flat voice coil motor and the free portion of the fourth flat voice coil motor to move a second distance towards the head at a same time, controlling the free portion of the first flat voice coil motor and the free portion of the second flat voice coil motor not to move, or controlling the free portion of the first flat voice coil motor and the free portion of the second flat voice coil motor to move in the direction away from the head to be at the initial distance from the head.

11. The method for controlling the head-mounted display apparatus according to claim 8, wherein the head-turning assisting device comprises a first flat voice coil motor, a second flat voice coil motor, a third flat voice coil motor and a fourth flat voice coil motor;

a stationary portion of each of the first flat voice coil motor, the second flat voice coil motor, the third flat voice coil motor and the fourth flat voice coil motor is fixed to the strap, and a free portion of each of the first flat voice coil motor, the second flat voice coil motor, the third flat voice coil motor and the fourth flat voice coil motor is positioned at a side, adjacent to the head, of the strap; and when the head-mounted display apparatus is worn on the head of the human body, the first flat voice coil motor is in contact with a left front side of the head, the second flat voice coil motor is in contact with a right rear side of the head, the third flat voice coil motor is in contact with a right front side of the head, and the fourth flat voice coil motor is in contact with a left rear side of the head.

12. The method for controlling the head-mounted display apparatus according to claim 11, wherein the free portion of the first flat voice coil motor and the free portion of the second flat voice coil motor are configured to move simultaneously by a same distance, and a free portion of the third flat voice coil motor and a free portion of the fourth flat voice coil motor are configured to move simultaneously by a same distance.

13. The method for controlling the head-mounted display apparatus according to claim 12, wherein when the free portion of the first flat voice coil motor and the free portion of the second flat voice coil motor move towards the head, the free portion of the third flat voice coil motor and the free portion of the fourth flat voice coil motor do not move or move in a direction away from the head;
  or, when the free portion of the third flat voice coil motor and the free portion of the fourth flat voice coil motor move towards the head, the free portion of the first flat voice coil motor and the free portion of the second flat voice coil motor do not move or move in a direction away from the head.

14. The method for controlling the head-mounted display apparatus according to claim 11, wherein each of the first flat voice coil motor, the second flat voice coil motor, the third flat voice coil motor and the fourth flat voice coil motor further comprises a motor controller and a motor driving circuit; and
  the motor controller is configured to receive a control signal transferred by the master controller and output a drive control signal to the motor driving circuit according to the control signal, and the motor driving circuit is configured to drive the free portion to move according to the drive control signal.

15. The method for controlling the head-mounted display apparatus according to claim 14, wherein the motor controller comprises an A/D conversion module, a pulse-width modulation module and a D/A conversion module; and
  an input terminal of the A/D conversion module is connected to the master controller, an output terminal of the A/D conversion module is electrically connected to an input terminal of the pulse-width modulation module, an output terminal of the pulse-width modulation module is electrically connected to the D/A conversion module, and an output terminal of the D/A conversion module is electrically connected to the motor driving circuit.

16. The method for controlling the head-mounted display apparatus according to claim 14, wherein each of the first flat voice coil motor, the second flat voice coil motor, the third flat voice coil motor and the fourth flat voice coil motor further comprises a feedback circuit, and the feedback circuit is electrically connected to each of the motor driving circuit and the motor controller.

* * * * *